United States Patent
Okada (10) Patent No.: US 9,843,051 B2
(45) Date of Patent: Dec. 12, 2017

(54) CATALYST PARTICLES, CATALYST INK, ELECTRODE CATALYST LAYER FOR FUEL CELLS, MEMBRANE ELECTRODE ASSEMBLY, POLYMER ELECTROLYTE FUEL CELL, METHOD FOR PRODUCING CATALYST PARTICLES AND METHOD FOR PRODUCING CATALYST INK

(71) Applicant: TOPPAN PRINTING CO., LTD., Tokyo (JP)

(72) Inventor: Saori Okada, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 918 days.

(21) Appl. No.: 14/248,917

(22) Filed: Apr. 9, 2014

(65) Prior Publication Data
US 2014/0220474 A1    Aug. 7, 2014

Related U.S. Application Data

(63) Continuation of application No. PCT/JP2012/075456, filed on Oct. 2, 2012.

(30) Foreign Application Priority Data

Oct. 14, 2011 (JP) .................. 2011-226914
Mar. 27, 2012 (JP) .................. 2012-071731

(51) Int. Cl.
*H01M 4/86* (2006.01)
*H01M 4/90* (2006.01)
(Continued)

(52) U.S. Cl.
CPC ....... *H01M 4/9083* (2013.01); *H01M 4/8668* (2013.01); *H01M 4/8828* (2013.01); *H01M 4/9058* (2013.01); *H01M 2008/1095* (2013.01)

(58) Field of Classification Search
CPC ............ H01M 4/8605; H01M 4/8668; H01M 4/8807; H01M 4/86; H01M 4/88
(Continued)

(56) References Cited

U.S. PATENT DOCUMENTS 5,752,988 A    5/1998 Okamoto et al.
2006/0229194 A1  10/2006 Uchida et al.
(Continued)

FOREIGN PATENT DOCUMENTS

CN        101038968        9/2007
JP        7-134995         5/1995
(Continued)

OTHER PUBLICATIONS

International Preliminary Report on Patentability and Written Opinion of the International Searching Authority dated Apr. 15, 2014 in corresponding International Patent Application No. PCT/JP2012/075456.
(Continued)

*Primary Examiner* — Khanh Tuan Nguyen (57) ABSTRACT

Catalyst particles includes a catalyst material and carbon particles supporting the catalyst material. The catalyst particles has a water content of 4.8 mass % or more and 20 mass % or less. A manufacturing method of catalyst particles includes exposing catalyst particles, which are carbon particles supporting a catalyst material, to a humidified atmosphere, prior to dispersing the carbon particles and a polymer electrolyte in a solvent for a catalyst ink.

14 Claims, 3 Drawing Sheets

(51) Int. Cl.
  *H01M 4/88* (2006.01)
  *H01M 8/1018* (2016.01)

(58) Field of Classification Search
  USPC .................................. 429/413, 484; 502/101
  See application file for complete search history.

(56) References Cited

U.S. PATENT DOCUMENTS

| | | |
|---|---|---|
| 2007/0160899 A1 | 7/2007 | Atanassova et al. |
| 2007/0224479 A1 | 9/2007 | Tadokoro et al. |

FOREIGN PATENT DOCUMENTS

| | | | | |
|---|---|---|---|---|
| JP | H07-134995 | * 5/1995 | .............. | H01M 4/96 |
| JP | 9-274924 | 10/1997 | | |
| JP | 2003-282074 | * 10/2003 | .............. | H01M 4/88 |
| JP | 2004-199915 | 7/2004 | | |
| JP | 2006-140062 | 6/2006 | | |
| JP | 2006-155921 | 6/2006 | | |
| JP | 2006-331845 | * 12/2006 | .............. | H01M 4/86 |
| JP | 2010-257929 | 11/2010 | | |

OTHER PUBLICATIONS

Extended European Search Report dated Oct. 7, 2014 in corresponding European Patent Application No. 12840540.4.
Chinese Office Action dated Oct. 28, 2015 in corresponding Chinese Patent Application No. 201280049882.X.
Japanese Office Action dated Jun. 7, 2016 in corresponding Japanese Patent Application No. 2013-538500.
International Search Report dated Jan. 8, 2013, in corresponding International Application No. PCT/JP2012/075456.

* cited by examiner

Fig.1

Fig.2(a) Supporting Step

Fig.2(b) Humidification Step

Fig.2(c) Dispersion Step

CATALYST PARTICLES, CATALYST INK, ELECTRODE CATALYST LAYER FOR FUEL CELLS, MEMBRANE ELECTRODE ASSEMBLY, POLYMER ELECTROLYTE FUEL CELL, METHOD FOR PRODUCING CATALYST PARTICLES AND METHOD FOR PRODUCING CATALYST INK

BACKGROUND OF THE DISCLOSURE

The technology of the present disclosure relates to catalyst particles, a catalyst ink, an electrode catalyst layer for a fuel cell, a membrane electrode assembly, and a polymer electrolyte fuel cell. The present disclosure further relates to a manufacturing method thereof. More specifically, the present disclosure relates to a method of manufacturing a catalyst ink and an electrode catalyst layer using catalyst particles comprising carbon particles supporting a catalyst material.

A polymer electrolyte fuel cell having a polymer electrolyte membrane as ion conductor is known as one type of fuel cells to directly convert the reaction energy of a raw material gas to electrical energy. The polymer electrolyte fuel cell is promising as an energy source of automobiles, railways, cogeneration systems, and the like because of its shorter startup time than that of other fuel cells and its capability of operating at normal temperature.

Although such a polymer electrolyte fuel cell is excellent in terms of startup time and operating temperature as described above, the problem for further implementation is that the power generation efficiency is low. Accordingly, various proposals for increasing the output voltage have been conventionally made in manufacturing technology of a polymer electrolyte fuel cell. For example, in the technique disclosed in Japanese Laid-Open Patent Publication No. 2010-257929, the relative permittivity of solution containing an ionomer is controlled within a predetermined range during manufacturing of a catalyst ink for forming an electrode catalyst layer. This is intended to increase ionomer coverage for catalyst particles.

In other words, increase in ionomer coverage for a support carbon material as a catalyst material supporting carbon is intended. Due to the increased uniformity of the support carbon material and the ionomer in an electrode catalyst layer, the utilization efficiency of catalyst particles in a membrane electrode assembly is increased, so that the output voltage of a polymer electrolyte fuel cell is intended to be increased.

In a specific technique disclosed in the Japanese Laid-Open Patent Publication No. 2010-257929, a dispersion liquid in which catalyst particles are dispersed and a solution of ionomer having a relative permittivity of 30 or more are prepared, respectively. The dispersion liquid and the solution of ionomer are then blended with each other to form a mixture liquid. A dispersion medium having a relative permittivity of 20 or less is added to the mixture liquid. This is intended to prevent the aggregation and gelation of the ionomer, so that the viscosity of the solution rises to the viscosity required for production of an electrode catalyst layer. In other words, performing these steps is intended to increase the ionomer coverage for catalyst particles in a catalyst ink.

In the step of adding the dispersion medium having a relative permittivity of 20 or less to the mixture liquid in which the ionomer is prevented from aggregating or gelating, however, the aggregation or gelation of ionomer locally occurs to no small extent, so long as the dispersing medium is nonuniformly added to the mixture liquid. It is difficult to uniformly add the dispersion medium to the mixture liquid to an extent not causing gelation or aggregation of the ionomer in the first place. In short, in order to increase the output voltage of a polymer electrolyte fuel cell, room for improvement still remains even in the technique described above.

The object of the present disclosure is to increase the output voltage of a polymer electrolyte fuel cell.

SUMMARY

In accordance with one aspect of the present disclosure, a manufacturing method of catalyst particles is provided that includes exposing catalyst particles, which are carbon particles supporting a catalyst material, to a humidified atmosphere, prior to dispersing the carbon particles and a polymer electrolyte in a solvent for a catalyst ink.

According to the above aspect, prior to the blending of the carbon particles supporting the catalyst material and the polymer electrolyte, the carbon particles are exposed to a humidified atmosphere. As a result, affinity between the surface of the carbon particles and the polymer electrolyte is enhanced compared to the case of carbon particles without undergoing such humidification. In a catalyst ink having carbon particles supporting a catalyst material and a polymer electrolyte dispersed, the uniformity of the carbon particles and the polymer electrolyte is thus increased. Accordingly, the utilization efficiency of a catalyst material is increased in an electrode catalyst layer. Furthermore, a polymer electrolyte fuel cell having the electrode catalyst layer manufactured by the manufacturing method is capable of having an increased output voltage.

In one form of the present disclosure, the manufacturing method further includes allowing the carbon particles to support the catalyst material prior to exposure of the carbon particles to the humidified atmosphere.

In manufacturing of an electrode catalyst layer, prior to the blending of the carbon particles supporting the catalyst material, i.e. catalyst particles, and the polymer electrolyte, the carbon particles may be heat treated in some cases. For example, by supporting a catalyst material on carbon particles, deposition of the catalyst material on the surface of the carbon particles may be conducted through evaporation of a solution containing the catalyst material and the carbon particles to dryness in some cases. In the case where the catalyst material is supported after the humidification, the water content of the catalyst particles after the humidification is reduced in response to heating during evaporation to dryness. As a result, the effect of humidification is reduced compared to, for example, the case using a method in which the carbon particles support the catalyst material prior to humidification.

In this regard, according to the above aspect, catalyst particles (carbon particles) are humidified after the carbon particles support a catalyst material. The effect of humidification of the carbon particles is thus hardly reduced, even in the case where the carbon particles are heated when the catalyst material is supported. In the case where the carbon particles are heated in supporting a catalyst material, the water content of the catalyst particles is low in the first place, compared to the case, for example, that carbon particles are not heated. Consequently, the above advantage of humidification is more remarkably exhibited.

In one form of the present disclosure, the manufacturing method further includes maintaining the temperature of the carbon particles below the temperature of the humidified atmosphere until the carbon particles are added to the solvent.

In manufacturing of an electrode catalyst layer as described above, prior to the blending of the carbon particles supporting the catalyst material, i.e. catalyst particles, and the polymer electrolyte, the carbon particles may be heated under atmospheric pressure in some cases. In this regard, the above aspect allows the temperature of carbon particles to be maintained below the humidification temperature until the carbon particles are added to a solvent. The reduction in water content of the catalyst particles after humidification is thus prevented. Accordingly, reduction of the effect of humidification is prevented.

In one form of the present disclosure, the exposure of the carbon particles to the humidified atmosphere includes adjusting a water content of the catalyst particles as the carbon particles supporting the catalyst material to 4.8 mass % or more and 11.4 mass % or less.

According to the above aspect, the water content of catalyst particles is 4.8 mass % or more and 11.4 mass % or less, so that the variation in the effect of humidification is reduced within a predetermined range. Since the water content of catalyst particles is 11.4 mass % or less, the water content of catalyst particles is prevented from increasing excessively. In other words, the time required for humidification may be prevented from being excessively prolonged. Accordingly, reduction in productivity of an electrode catalyst layer due to the time and work for humidification can be prevented.

In one form of the present disclosure, the exposure of the carbon particles to the humidified atmosphere includes exposing the carbon particles to the humidified atmosphere having a temperature of 80° C. or higher and 130° C. or lower.

According to the above aspect, the temperature of the humidified atmosphere is 80° C. or higher and 130° C. or lower. The saturated vapor pressure in a humidified atmosphere can therefore be increased, for example, compared to the case where the humidified atmosphere is at room temperature. Consequently, the humidification time for raising the water content of catalyst particles to a predetermined value can be shortened, for example, compared to the case where the humidified atmosphere is at room temperature.

In one form of the present disclosure, the exposure of the carbon particles to the humidified atmosphere includes exposing the carbon particles to the humidified atmosphere having a relative humidity of 90% RH or more and less than 100% RH.

According to the above aspect, the relative humidity of the humidified atmosphere is 90% RH or more and less than 100% RH. The humidification time for raising the water content of catalyst particles to a predetermined value can be shortened, for example, compared to the case where the relative humidity is less than 90% RH.

In one form of the present disclosure, the manufacturing method further includes providing, as the carbon particles to be exposed to the humidified atmosphere, carbon particles having a specific surface area measured in accordance with JIS K 6217-2 of 200 $m^2/g$ or more and 1,500 $m^2/g$ or less.

According to the above aspect, the fine pores of the catalyst particles are easily hydrated with water in a humidified atmosphere. Accordingly, the diffusivity of gas in a membrane electrode assembly is maintained within an appropriate range.

A manufacturing method of a catalyst ink according to the present disclosure includes: forming the catalyst ink by dispersing the catalyst particles manufactured by the manufacturing method according to any one of claims 1 to 7 and a polymer electrolyte in a solvent; and adjusting the weight ratio of the polymer electrolyte to the catalyst particles as the carbon particles supporting the catalyst material to 0.04 or more and 3.00 or less.

According to the above aspect, the variation in the effect of humidification due to the difference in the weight ratio can be reduced to a predetermined range.

Catalyst particles according to the present disclosure include a catalyst material and carbon particles supporting the catalyst material, wherein the catalyst particles has a water content of 4.8 mass % or more and 20 mass % or less.

Such a water content of catalyst particles is achieved by exposure of the catalyst particles to a humidified atmosphere prior to the blending of the catalyst particles and the polymer electrolyte. If the catalyst particles having such a water content and the polymer electrolyte are dispersed in a solvent, the affinity between the surface of catalyst particles and the polymer electrolyte is enhanced. As a result, a catalyst ink of the dispersed catalyst particles and the polymer electrolyte has improved uniformity of the carbon particles and the polymer electrolyte. Accordingly, the utilization efficiency of the catalyst material in an electrode catalyst layer increases, and the output voltage of a polymer electrolyte fuel cell can be increased.

In one form of the present disclosure, the catalyst particles have a specific surface area measured in accordance with JIS K 6217-2 of 200 $m^2/g$ or more and 1,500 $m^2/g$ or less.

According to the above aspect, the fine pores of the catalyst particles are easily hydrated with water in a humidified atmosphere. Accordingly, the diffusivity of gas in a membrane electrode assembly is maintained within an appropriate range.

In one form of the present disclosure, the water content of the catalyst particles is achieved by exposing the carbon particles to the humidified atmosphere prior to dispersion of the catalyst particles and the polymer electrolyte in a solvent for a catalyst ink. If the catalyst particles heated to have such a water content and the polymer electrolyte are dispersed in a solvent, the uniformity of the catalyst particles and the polymer electrolyte is improved.

A catalyst ink according to the present disclosure is produced by dispersing the catalyst particles described above and a polymer electrolyte in a solvent. A weight ratio of the polymer electrolyte to the catalyst particles is 0.04 or more and 3.00 or less.

According to the above aspect, the variation in the effect of humidification due to the difference in the weight ratio may be reduced in a predetermined range.

An electrode catalyst layer for a fuel cell according to the present disclosure is formed on a substrate by applying the catalyst ink described above to the substrate.

According to the above aspect, the affinity between the surface of carbon particles and the polymer electrolyte is enhanced by exposure of the carbon particles to a humidified atmosphere prior to the blending of the catalyst particles and the polymer electrolyte, even for a small amount of supported catalyst.

A membrane electrode assembly of a polymer electrolyte fuel cell according to the present disclosure includes the electrode catalyst layer described above for constituting at least an air electrode of a fuel electrode and the air electrode.

In a fuel cell, the reaction barrier for a reaction at an air electrode is generally larger than the reaction barrier for a reaction at a fuel electrode. Consequently the activity of a reaction at an air electrode has a larger effect on the progress of an electrode reaction. In this regard, according to the above aspect, the utilization efficiency of the catalyst material is increased in the electrode catalyst layer of the air electrode, so that the reaction at least at the air electrode is activated. As a result, the output voltage of a polymer electrolyte fuel cell can be increased compared to, for example, the case where only the electrode catalyst layer constituting a part of the fuel electrode is humidified in advance in manufacturing.

A polymer electrolyte fuel cell according to the present disclosure includes the membrane electrode assembly described above and a pair of separators for sandwiching the membrane electrode assembly therebetween.

Such a polymer electrolyte fuel cell allows the output voltage to be efficiently increased.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIGS. 2(a) to 2(c) are schematic diagrams showing states of catalyst particles in the manufacturing method shown in FIG. 1, where

DETAILED DESCRIPTION OF THE PREFERRED EMBODIMENTS

FIGS. 1 to 5 illustrate catalyst particles, a catalyst ink, an electrode catalyst layer for a fuel cell electrode, a membrane electrode assembly, and a polymer electrolyte fuel cell in a specified embodiment of the present disclosure. Furthermore, the manufacturing methods thereof are described below. Since the polymer electrolyte fuel cell of the present embodiment has a high-performance electrode catalyst layer, the electrode catalyst layer is mainly described among the components. The technology in the present disclosure is not limited to the embodiments described below. Modifications such as design changes based on the knowledge of those skilled in the art may be made, and the embodiments having such modifications are also included within the scope of the embodiment of the present disclosure. In the beginning, the outline of a polymer electrolyte fuel cell is described.

Figure 5:
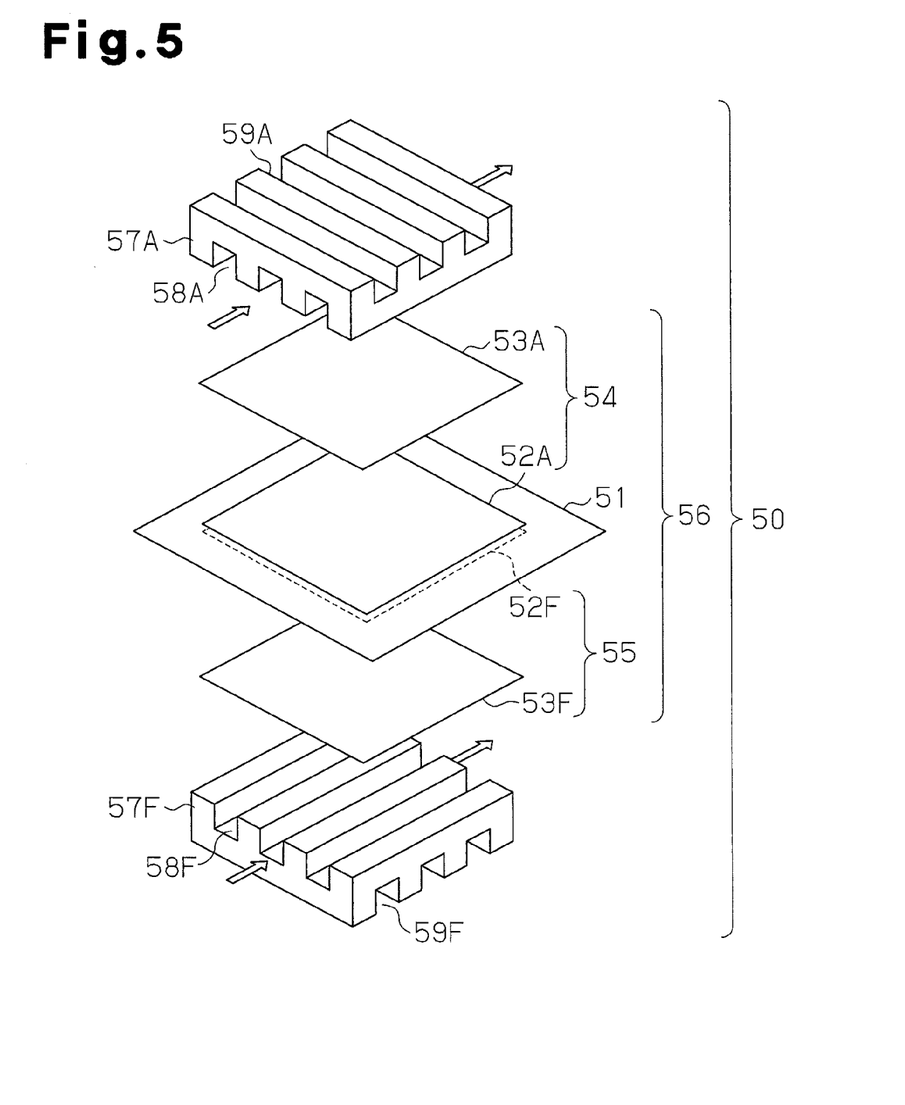
FIG. 5 is an exploded perspective view showing the internal structure of a polymer electrolyte fuel cell.

As shown in FIG. 5, a polymer electrolyte fuel cell 50 includes a membrane electrode assembly (MEA) 56, and a pair of separators 57A and 57F sandwiching opposite sides of the membrane electrode assembly 56. The membrane electrode assembly 56 includes a polymer electrolyte membrane 51, and an air electrode 54 as cathode and a fuel electrode 55 as anode, which are opposed to each other across the polymer electrolyte membrane 51. The air electrode 54 includes an electrode catalyst layer 52A, which is joined to one surface of the polymer electrolyte membrane 51, and a gas diffusion layer 53A, which is joined to the electrode catalyst layer 52A. The fuel electrode 55 includes an electrode catalyst layer 52F, which is joined to the remaining surface of the polymer electrolyte membrane 51, and a gas diffusion layer 53F, which is joined to the electrode catalyst layer 52F. The separators 57A and 57F include surfaces facing the membrane electrode assembly 56, which are provided with grooved gas flow paths 58A and 58F in a stripe form and surfaces opposite to the membrane electrode assembly 56, which are provided with grooved cooling water flow paths 59A and 59F in a stripe form, orthogonal to the gas flow paths 58A and 58F, respectively.

In the polymer electrolyte fuel cell 50 described above, cooling water is caused to flow through the cooling water flow paths 59A and 59F, and, for example, oxygen gas is caused to flow through the gas flow path 58A of the air electrode 54. For example, hydrogen gas is caused to flow through the gas flow path 58F of the fuel electrode 55. The proceeding of an electrode reaction between oxygen gas and hydrogen gas under the presence of a catalyst allows an electromotive force to be generated between a pair of gas diffusion layers 53A and 53F.

Figure 1:
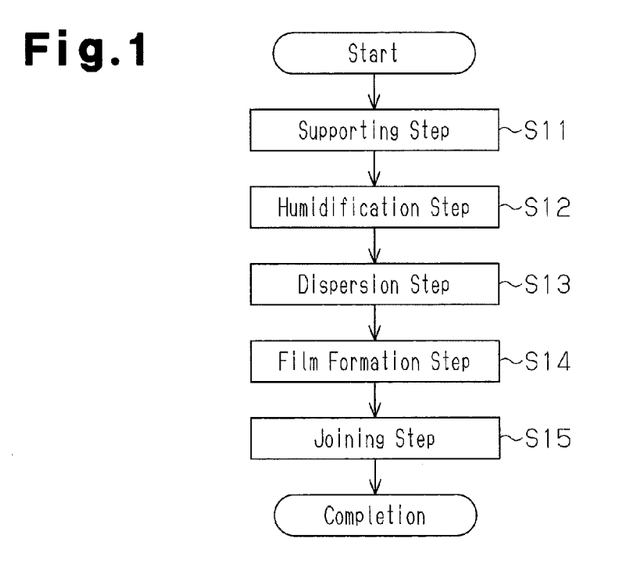
FIG. 1 is a flowchart showing steps of a manufacturing method of an electrode catalyst layer of a fuel cell in one embodiment of the present disclosure.

As shown in FIG. 1, the manufacturing method of the membrane electrode assembly 56 for use in the polymer electrolyte fuel cell 50 includes a supporting step as step S11, a humidification step as step S12, a dispersion step as step S13, a film forming step as step S14, and a joining step as step 15, in this order. Among them, steps S11 to S14 illustrate the manufacturing method of the electrode catalyst layers 52A and 52F. Steps S11 to S12 illustrate the manufacturing method of catalyst particles having a desired water content, and steps S11 to S13 illustrate the manufacturing method of a catalyst ink.

[Supporting Step S11]

Figures 2A, 2B, 2C:
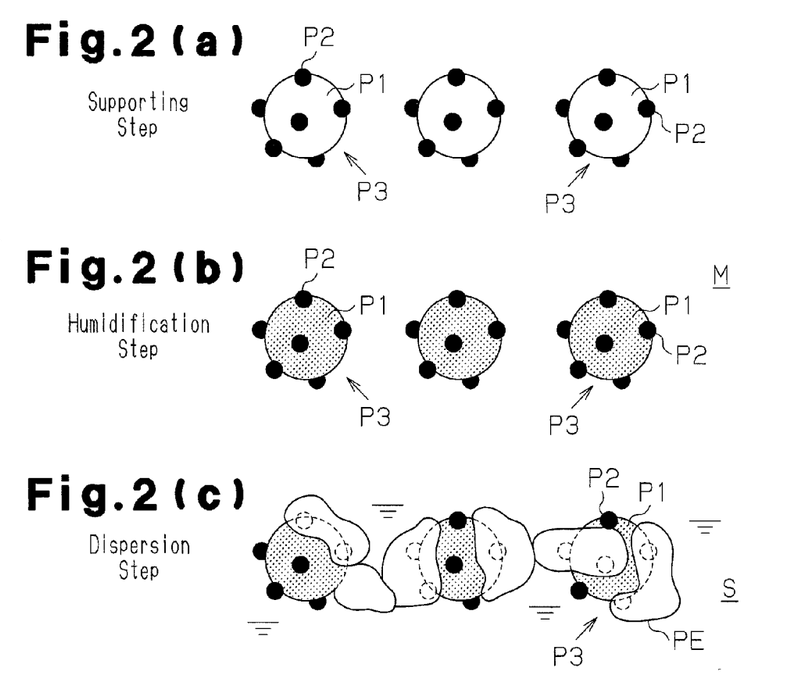
FIG. 2(a) is a schematic diagram showing the state of catalyst particles in a supporting step.
FIG. 2(b) is a schematic diagram showing the state of catalyst particles in a humidification step (humidification treatment)
FIG. 2(c) is a process chart showing the state of catalyst particles in a dispersion step.

As shown in FIG. 2(a), first, carbon particles P1 support a catalyst material P2 composed of a metal element in the supporting step S11. For example, a metal salt composed of a metal element constituting the catalyst material P2 and a precursor of carbon particles are blended each other to form a mixture. The mixture is then fired, so that the carbon particles P1 support the catalyst material P2. The carbon particles P1 which support the catalyst material P2 may be hereinafter referred to as a catalyst material supporting carbon material, i.e. a support carbon material. The support carbon material means catalyst particles P3. In other words, the catalyst particles P3 are formed, for example, by firing a solution containing the catalyst material P2 and the carbon particles P1.

The carbon particles P1 may fine particles of carbon as the constituent element, having conductivity, and having erosion resistance to the catalyst material P2. Graphite carbon, carbon fiber, carbon nanotubes, nanohorns, and fullerenes are suitably used. The particle size of the carbon particles P1 is preferably 10 nm or more and 1 μm or less, more preferably 10 nm or more and 100 nm or less. For example, a particle size of the carbon particles P1 of less than 10 nm causes difficulty in forming an electron conduction path, while a particle size of the carbon particles P1 of more than 1 μm reduces gas diffusivity in the electrode catalyst layers 52A and 52F, resulting in reduction in utilization rate of the catalyst material P2.

The catalyst material P2 is a material that accelerates the reaction rate of a cell reaction (electrode reaction) in the fuel cell 50. For example, platinum or a platinum alloy is used. Examples of the metal elements in the platinum alloy include palladium, ruthenium, and molybdenum. Ruthenium is preferred, in particular. The platinum alloy may include an additive metal such as tungsten, tin, and rhenium. The platinum alloy including such an additive metal has improved toxicity resistance to carbon monoxide, compared to, for example, a platinum alloy including no additive metal. The additive metal to be added to a platinum alloy may be present as an intermetallic compound in the platinum alloy or may form an alloy. The particle size of the catalyst material P2 is preferably 0.5 nm or more and 20 nm or less, more preferably 1 nm or more and 5 nm or less. For example, a particle size of the catalyst material P2 of more than 20 nm reduces the activity of the catalyst material P2, while, for example, a particle size of the catalyst material P2 less than 0.5 nm reduces the stability of the catalytic material P2.

[Humidification Step S12]

Subsequently, in the humidification step S12, i.e. humidification treatment, the carbon particles P1, which support the catalyst material P2, i.e. catalyst particles P3, are exposed to a humidified atmosphere M, as shown in FIG. 2(b). For example, the catalyst particles P3 is carried into a thermostatic chamber having the humidified atmosphere M with a controlled predetermined relative humidity, temperature, and pressure, so that the catalyst particles P3 are exposed to the humidified atmosphere M for a predetermined time. As a result, the water content on the surface and inside of the catalyst particles P3 increases. In the FIG. 2(b), the dot pattern hatching indicates that catalyst particles P3 are hydrated with water.

The specific surface area of the catalyst particles P3 measured in accordance with Japanese Industrial Standard JIS K 6217-2, is preferably 200 m$^2$/g or more and 1,500 m$^2$/g or less. A specific surface area of 200 m$^2$/g or more allows the fine pores of the catalyst particle P3 to be easily hydrated with water in the humidification step S12. A specific surface area of 1,500 m$^2$/g or less allows the gas diffusivity of the membrane electrode assembly 56 to be maintained in an appropriate range.

JIS K 6217-2 defines "Carbon black for rubber industry—Fundamental characteristics—Part 2: Determination of specific surface area—Nitrogen adsorption method—Single-point procedures". JIS K 6217-2 is based on ISO 4652-1: 1994, Rubber compounding ingredients—Carbon black—Determination of specific surface area by nitrogen adsorption methods—Part1: Single-point procedures.

In the supporting step S11 for supporting the catalyst material P2 on carbon particles P1, heating of the solution, which contains the catalyst material P2 and the carbon particles P1, results in evaporation to dryness and causes deposition of the catalyst material P2 on the surface of the carbon particles P1 in some cases. In the case where the supporting step S11 is performed after the humidification step S12, the water content of the catalyst particles P3 after humidification in step S12 may be reduced in response to the heating of the carbon particles P1 in step S11. In the present embodiment, however, the catalyst material P2 is supported by the carbon particles P1 in step S11, and then humidified in step S12. Consequently, even if the carbon particles P1 are heated in the supporting step S11, the water content of the carbon particles P1, which has undergone step S12, is hardly reduced.

Preferably the water vapor pressure of the humidified atmosphere M is lower than the saturated water vapor pressure at the humidification temperature, such that no dew condensation occurs on the catalyst material P2 supporting carbon particles P1, i.e. the catalyst particles P3, and no dew condensation occurs in an accommodation chamber for accommodating the carbon particles P1. If dew condensation occurs on the carbon particles P1 and the catalyst particles P3, or if dew condensation occurs in an accommodation chamber for accommodating the carbon particles P1, the water content varies for each of the catalyst particles P3.

The temperature of the humidified atmosphere M is preferably 40° C. or higher and 130° C. or lower, and the relative humidity of the humidified atmosphere M is preferably 60% RH or more and less than 100% RH. More preferably, the temperature of the humidified atmosphere M is 80° C. or higher and 130° C. or lower, and the relative humidity RH of the humidified atmosphere M is 90% RH or more and less than 100% RH. At a humidification temperature higher than room temperature, the saturated water vapor pressure in the humidified atmosphere M increases. At a humidification temperature higher than room temperature, the time required for increasing the water content of the catalyst particles P3 to a predetermined value can therefore be shortened compared to, for example, the case where the humidification temperature is equal to or lower than room temperature. During the period after the carbon particles P1 are exposed to the humidified atmosphere M and until the carbon particles P1 are added to a solvent, preferably the humidification temperature described above is the highest temperature. Such a temperature change allows the temperature of the carbon particles P1 to be maintained below the humidification temperature until the carbon particles P1 are added to a solvent. This prevents the reduction in water content of the carbon particles P1 after the humidification step.

The water content (mass %) is defined as the proportion of the mass of water contained in the catalyst particles P3, in the mass of the catalyst particles P3. Process time required for the unit increment of the water content of the catalyst particles P3 in the humidification step S12 is prolonged as the water content of the catalyst particles P3 increases. The water content of the catalyst particles P3 having the particle size described above is almost saturated at approximately 20 mass %. The exposure time for the carbon particles P1 to the humidification atmosphere M is thus preferably the time for the catalyst particles P3 to achieve a water content of 4.8 mass % or more and 20 mass % or less, more preferably 4.8 mass % or more and 11.4 mass % or less. For example, in the case of humidified atmosphere M with a temperature of 80° C. or higher and 130° C. or lower, and a relative humidity of 90% RH or more and less than 100% RH, the time for the carbon particles P1 to be exposed to the humidified atmosphere M is preferably 20 hours or more and 100 hours or less.

The carbon particles P1 are exposed to the humidified atmosphere M prior to the blending of the catalyst particles P3 and the polymer electrolyte PE, so that the affinity between the surface of the carbon particles P1 and the polymer electrolyte PE is enhanced. As a result, the amount of the catalyst material P2 to be supported on the carbon particles P1 can be in the range of 0.1 mg/cm² or more and 0.3 mg/cm² or less, more specifically in the range of 0.17 mg/cm² or more and 0.22 mg/cm² or less. A desired output voltage of the polymer electrolyte fuel cell 50 is thus obtained with a smaller amount of the supported catalyst material P2. In other words, the carbon particles P1 are exposed to the humidified atmosphere M prior to the blending of the catalyst particles P3 and the polymer electrolyte PE, so that the output voltage of the polymer electrolyte fuel cell 50 is increased even with a smaller amount of the supported catalyst material P2 to be supported on the carbon particles P1.

[Dispersion Step S13]

Subsequently, in the dispersion step S13, the catalyst particles P3, which has undergone the humidification step S12, and the polymer electrolyte PE are dispersed in an ink solvent S to form a catalyst ink, as shown in FIG. 2(c). In other words, in the present embodiment, prior to the blending of the catalyst material P2 supporting carbon particles P1, i.e. the catalyst particles P3, and the polymer electrolyte PE in step S13, the catalyst particles P3 are exposed to the humidified atmosphere M in step S12. The affinity between the surface of the catalyst particles P3 and the polymer electrolyte PE is thus enhanced compared to, for example, a method including no humidification step S12 applied to the catalyst particles P3. According to the present embodiment, the uniformity of the catalyst particles P3 and the polymer electrolyte PE is therefore improved in a catalyst ink of the dispersed catalyst material P2 supporting carbon particles P1 and the polymer electrolyte PE. In production of the catalyst ink, dispersion treatment with a disperser is performed on an as needed basis in order to adjust the viscosity of the catalyst ink to a predetermined value, or in order to adjust the particle size in the catalyst ink to a predetermined value. Examples of the dispersion treatment include a treatment with a ball mill or a roll mill, a treatment with a shear mill, a treatment with a wet mill, a treatment with an ultrasonic disperser, and a treatment with a homogenizer for agitation by centrifugal force.

A polymer material having proton conductivity is used for the polymer electrolyte PE. For example, a fluorine-based polymer electrolyte or a hydrocarbon-based polymer electrolyte is used. Examples of the fluorine-based polymer electrolyte include NAFION (registered trademark) made by DuPont, FLEMION (registered trademark) made by Asahi Glass Co., Ltd., ACIPLEX (registered trademark) made by Asahi Kasei Corporation and GORE-SELECT (registered trademark) made by W. L. Gore & associates. Among them, NAFION (registered trademark) made by DuPont is suitable for increasing the output voltage of the polymer electrolyte fuel cell 50. Examples of the hydrocarbon-based polymer electrolyte membrane include an electrolyte membrane of sulfonated polyether ketone, sulfonated polyether sulfone, sulfonated polyether ether sulfone, sulfonated polysulfide or sulfonated polyphenylene.

As the ink solvent S, a solvent causing no erosion of any of the carbon particles P1, the catalyst material P2, and the polymer electrolyte PE is used, allowing the polymer electrolyte PE to be dissolved in a flowable state or the polymer electrolyte PE to be dispersed as fine gel. Preferably the ink solvent S includes a volatile organic solvent. Examples of the organic solvent in the ink solvent S include alcohols such as methanol, ethanol, 1-propanol, 2-propanol, 1-butanol, 2-butanol, isobutyl alcohol, tert-butyl alcohol, and pentanol; a ketone-based solvent such as acetone, methyl ethyl ketone, pentanone, methyl isobutyl ketone, heptanone, cyclohexanone, methyl cyclohexanone, acetonyl acetone, and diisobutyl ketone; an ether-based solvent such as tetrahydrofuran, dioxane, diethylene glycol dimethyl ether, anisole, methoxytoluene, and dibutyl ether; a polar solvent such as dimethylformamide, dimethylacetamide, N-methylpyrrolidone, ethylene glycol, diethylene glycol, diacetone alcohol, and 1-methoxy-2-propanol; or a mixture of two or more of the above solvents. In the case of using a lower alcohol as the organic solvent, preferably the ink solvent S is a mixed solvent with water to have a higher ignition temperature. Preferably the ink solvent S contains water to an extent not to cause, for example, white turbidity due to separation of the polymer electrolyte PE from the ink solvent S or gelation of the polymer electrolyte PE, also from the view point of enhancement of the affinity with the polymer electrolyte PE.

In the catalyst ink, the catalyst particles P3 and the polymer electrolyte PE are included as a solid content. An excessive amount of the solid content allows cracks to easily occur in the surface of the electrode catalyst layers 52A and 52F due to the increased viscosity of the catalyst ink. In contrast, an excessively small amount of the solid content slows the film forming rate of the electrode catalyst layers 52A and 52F, resulting in reduction in productivity of the electrode catalyst layers 52A and 52F. In order to prevent occurrence of cracks in surface of the electrode catalyst layers 52A and 52F, and in order to secure the film forming rate of the electrode catalyst layers 52A and 52F, the viscosity of the catalyst ink is preferably in the range from 0.1 mPa·s to 0.5 Pa·s (0.1 cP to 500.0 cP), more preferably from 5.0 mPa·s to 0.1 Pa·s (5.0 cP to 100.0 cP). Preferably the amount of solid content of the catalyst ink is 1 mass % or more and 50 mass % or less.

Meanwhile, even if one catalyst ink has the same amount of solid content as another, the larger the proportion of the carbon particles P1 (the catalyst particles P3) in the catalyst ink, the higher the viscosity of the catalyst ink becomes, while the smaller the proportion of the carbon particles P1 in the catalyst ink, the lower the viscosity of the catalyst ink becomes. The concentration of the carbon particles P1 in the solid content is, therefore, preferably 10 mass % or more and 80 mass % or less. Further to the adjustment of the amount of solid content in the catalyst ink and the adjustment of the concentration of the carbon particles P1 in the solid content, the addition of a dispersant to the catalyst ink during the dispersion treatment also allows the viscosity of the catalyst ink to be adjusted to a predetermined value. The weight ratio of the polymer electrolyte PE to the catalyst material P2 supporting carbon particles P1, i.e. the catalyst particles P3 is preferably 0.04 or more and 3.00 or less. A weight ratio in the range allows the features described above to be easily achieved. Furthermore, for example, the variation in the effect of the humidification step due to the effect of difference in the weight ratio may be kept within a predetermined range.

The catalyst ink may further include pore forming agent in addition to the catalyst particles P3, the polymer electrolyte PE, and the ink solvent S. The pore forming agent is removed from the formed electrode catalyst layers 52A and 52F to form pores in the electrode catalyst layers 52A and 52F. As the pore forming agent, for example, a material to be dissolved in an acid, an alkali, or water, a material to be sublimed such as camphor, or a material to be thermally decomposed may be used. A material to be dissolved in hot water may be used as the pore forming agent. In other words, the configuration may include the removal of a pore forming agent with water generated during power generation by the polymer electrolyte fuel cell 50. Examples of the pore forming agent to be dissolved in an acid, an alkali, or water include: acid-soluble inorganic salts such as calcium carbonate, barium carbonate, magnesium carbonate, magnesium sulfate and magnesium oxide; inorganic salts soluble in an alkaline aqueous solution such as alumina, silica gel, and silica sol; metals soluble in an acid or an alkali such as aluminum, zinc, tin, nickel, and iron; water-soluble inorganic salts such as sodium chloride, potassium chloride, ammonium chloride, sodium carbonate, sodium sulfate, and monosodium phosphate; water-soluble organic compounds such as polyvinyl alcohol and polyethylene glycol; or pore forming agents of two or more of these mixed with each other.

[Film Forming Step S14]

Subsequently, in the film forming step S14, the catalyst ink is applied to the substrate so that the electrode catalyst layers 52A and 52F are formed through the step of drying the catalyst ink. Due to the uniformity of the catalyst particles P3 and the polymer electrolyte PE improved by the previously performed humidification step S12 and dispersion step S13, the uniformity of the catalyst particles P3 and the polymer electrolyte PE in the electrode catalyst layers 52A and 52F is also improved. At least one of a polymer electrolyte membrane 51, gas diffusion layers 53A and 53F, and a transfer sheet is used for a substrate. In the case of using a transfer sheet as the substrate, the electrode catalyst layers 52A and 52F respectively formed on the transfer sheets are joined to the opposite sides of the polymer electrolyte membrane 51. The transfer sheets are then detached from the electrode catalyst layers 52A and 52F. On the other hand, in the case of using at least one of the polymer electrolyte membrane 51, and the gas diffusion layers 53A and 53F as the substrate, the step of detaching the substrate from the electrode catalyst layers 52A and 52F is unnecessary in the first place.

The polymer electrolyte membrane 51 is a polymer membrane having proton conductivity. As the material for use in the polymer electrolyte membrane 51, for example, a fluorine-based polymer electrolyte and a hydrocarbon-based polymer electrolyte may be used. Examples of the fluorine-based polymer electrolyte include NAFION (registered trademark) made by DuPont, FLEMION (registered trademark) made by Asahi Glass Co., Ltd., ACIPLEX (registered trademark) made by Asahi Kasei Corporation, and GORE-SELECT (registered trademark) made by W. L. Gore & associates. Among them, NAFION (registered trademark) made by DuPont is suitable for increasing the output voltage of the polymer electrolyte fuel cell 50. Examples of the hydrocarbon-based polymer electrolyte membrane include an electrolyte membrane of sulfonated polyether ketone, sulfonated polyether sulfone, sulfonated polyether ether sulfone, sulfonated polysulfide and sulfonated polyphenylene. In order to ensure the adhesion between the electrode catalyst layers 52A and 52F and the polymer electrolyte membrane 51, preferably the electrode catalyst layers 52A and 52F and the polymer electrolyte membrane 51 are formed of the same material.

The gas diffusion layers 53A and 53F are sheets made of a material having gas diffusivity and conductivity, made of, for example, a porous carbon material such as carbon cloth, carbon paper, and nonwoven fabric. In the case of using the gas diffusion layers 53A and 53F as a substrate, preferably a filler layer is preliminarily formed on the application surface of the gas diffusion layers 53A and 53F to be applied with the catalyst ink. The filler layer prevents the catalyst ink from permeating the gas diffusion layers 53A and 53F. In the case where the application amount of the catalyst ink is small, the catalyst ink builds up on the filler layer so that the filler layer forms a three-layer interface, which is particularly preferred. As the filler layer, for example, a layer formed by sintering a fluorine-based resin solution with dispersed carbon particles at a temperature equal to or higher than the melting point of the fluorine-based resin may be used. Examples of the fluorine-based resin include polytetrafluoroethylene (PTFE).

The transfer sheet is a sheet made of a material that allows the electrode catalyst layers 52A and 52F to be detached, being made of, for example, a fluorine-based resin such as ethylene tetrafluoroethylene copolymer (ETFE), tetrafluoroethylene-hexafluoropropylene copolymer (FEP), tetrafluoro-perfluoroalkyl vinyl ether copolymer (PFA), and polytetrafluoroethylene (PTFE). Examples of the transfer sheet also include a polymer sheet or a polymer film of polyimide, polyethylene terephthalate, polyamide (nylon), polysulfone, polyether sulfone, polyphenylene sulfide, polyether ether ketone, polyetherimide, polyarylate, or polyethylene naphthalate.

Examples of the application method for applying the catalyst ink to a substrate include a doctor blade method, a dipping method, a screen printing method, a roll coating method, and a spray method. Among these, the spraying method such as pressurized spraying, ultrasonic spraying, or electrostatic spraying is preferred, hardly causing aggregation of the applied catalyst ink during drying, so that uniform electrode catalyst layers 52A and 52F having a high porosity can be obtained.

[Joining Step S15]

In the subsequent joining step S15, the electrode catalyst layers 52A and 52F are joined to the opposite sides of the polymer electrolyte membrane 51, and gas diffusion layers 53A and 53F are further joined onto the electrode catalyst layers 52A and 52F, so that the membrane electrode assembly 56 is formed.

First, the two electrode catalyst layers 52A and 52F manufactured by the manufacturing method and the polymer electrolyte membrane 51 are positioned and arranged, such that the two electrode catalyst layers 52A and 52F sandwich the opposite sides of the polymer electrolyte membrane 51 to be opposed to each other.

For example, in the case of using the polymer electrolyte membrane 51 as the substrate, since the electrode catalyst layers 52A and 52F have already been formed on the opposite sides of the polymer electrolyte membrane 51, the arrangement described above is already achieved. Subsequently, the gas diffusion layers 53A and 53F are arranged on the opposite sides of the polymer electrolyte membrane 51 from above the electrode catalyst layers 52A and 52F, which are heated and pressurized to form one membrane electrode assembly 56.

Alternatively, in the case of using the gas diffusion layers 53A and 53F as the substrate, the polymer electrolyte membrane 51 is arranged between the pair of gas diffusion layers 53A and 53F having the electrode catalyst layers 52A and 52F formed. These are heated and pressurized to form the membrane electrode assembly 56.

Alternatively, in the case of using a transfer sheet as the substrate, the transfer sheets having electrode catalyst layers 52A and 52F formed are arranged on the opposite sides of the polymer electrolyte membrane 51, and are first heated and pressurized to form a membrane structure. Subsequently the transfer sheet is detached from the membrane structure to obtain the polymer electrolyte membrane 51 having the electrode catalyst layers 52A and 52F. The gas diffusion layers 53A and 53F are arranged to sandwich the opposite sides of the polymer electrolyte membrane 51. The gas diffusion layers 53A and 53F and the polymer electrolyte membrane 51 are heated and pressurized to form one membrane electrode assembly 56.

[Manufacturing Method of Polymer Electrolyte Fuel Cell 50]

The membrane electrode assembly 56 formed as described above is held with a pair of separators 57A and 57F to produce a polymer electrolyte fuel cell 50. As the separators 57A and 57F, for example, a carbon type or a metal type separator is used. The separators 57A and 57F may be integrally formed with the gas diffusion layers 53A and 53F in advance. In the case of the separators 57A and 57F or the electrode catalyst layers 52A and 52F having a gas diffusion function as in the gas diffusion layers 53A and 53F, the gas diffusion layers 53A and 53F may be omitted.

The following specific Examples and Comparative Examples illustrate the manufacturing method of the electrode catalyst layers 52A and 52F and the manufacturing method of the polymer electrolyte fuel cell 50. The measurement results in Examples 1 to 4 and Comparative Example 1 are shown in Table 1 and FIG. 3.

Example 1

[Humidification Step S12]

As the catalyst material P2 supporting carbon particles P1, i.e. catalyst particles P3, platinum supporting carbon (product name: TEC10E50E, made by Tanaka Kikinzoku Kogyo K.K.) was used. A humidified atmosphere M having a temperature of 80° C., a relative humidity of 90% RH, and a pressure of atmospheric pressure was formed in a thermostatic chamber. The catalyst particles P3 were exposed to the humidified atmosphere M for 100 hours. The water content of the catalyst particles P3 in Example 1 was measured with a simultaneous thermogravimetry and differential thermal analyzer (TG/DTA made by SII Nanotechnology Inc.). On this occasion, the catalyst particles P3 in Example 1 were first held at room temperature under a nitrogen atmosphere for 1 hour, and the weight of the catalyst particles P3 in Example 1 was then measured as the initial weight. Subsequently the catalyst particles P3 were heated up to 180° C. at a temperature rise rate of 1° C./min, and held at 180° C. for 5 hours. The water content was then calculated from the difference between the weight of the catalyst particles P3 and the previously measured initial weight.

[Dispersion Step S13]

Subsequently, using NAFION (registered trademark, made by DuPont) i.e. 20 mass % solution of a polymer electrolyte as the polymer electrolyte PE and the ink solvent S, the polymer electrolyte solution and the catalyst particles P3 in Example 1 were dispersed by a planetary ball mill (trade name: P-7, made by Fritsch Japan Co., Ltd.) to obtain a catalyst ink. On this occasion, the pot and the balls of the ball mill for use were made of zirconia. The composition of the catalyst particles P3 and the polymer electrolyte PE was adjusted such that the mass ratio of the catalyst particles P3 to the polymer electrolyte PE became 1:0.8. The composition of the ink solvent S was adjusted such that the volume ratio of ultra-pure water to 1-propanol became 1:1.

[Film Forming Step S14]

Subsequently, the catalyst ink in Example 1 was applied to a transfer sheet by a doctor blade method. The catalyst ink applied to the transfer sheet was dried in the air atmosphere at a temperature of 80° C. for 5 minutes to obtain the electrode catalyst layers 52A and 52F in Example 1. On this occasion, the thickness of the electrode catalyst layers 52A and 52F was adjusted such that the amount of the supported catalyst material P2 became 0.4 mg/cm$^2$.

[Joining Step S15]

Figure 3:
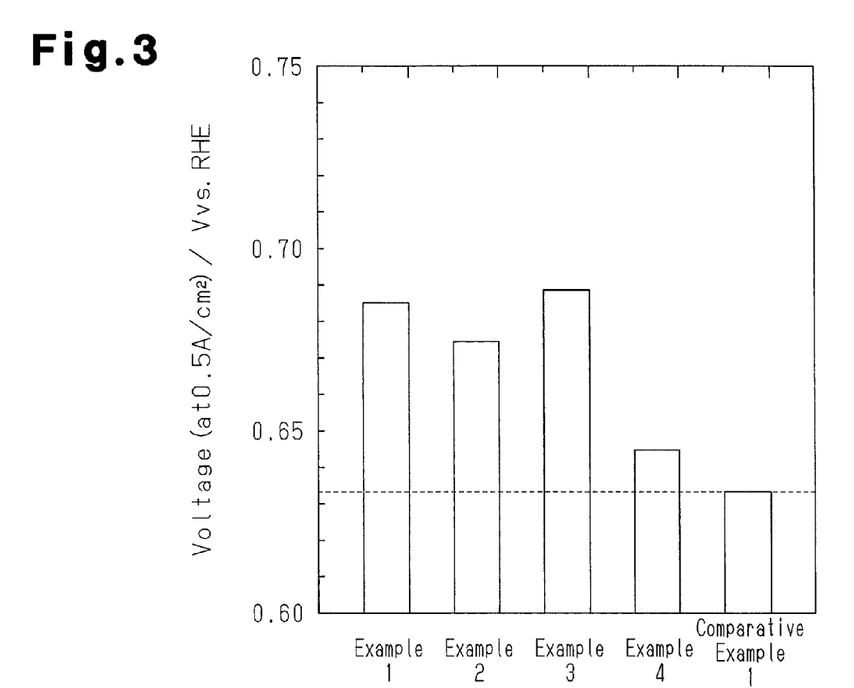
FIG. 3 is a bar graph showing the output voltage of polymer electrolyte fuel cells having an electrode catalyst layer manufactured by the method shown in FIG. 1 together with the output voltage in a Comparative Example.

Subsequently, using NAFION 212 (registered trademark, made by DuPont) as the polymer electrolyte membrane 51, two transfer sheets and the polymer electrolyte membrane 51 were arranged such that the electrode catalyst layers 52A and 52F in Example 1 cut out in a square shape of 5 cm$^2$ and the opposite sides of the polymer electrolyte membrane 51 were opposed to each other. Subsequently, the polymer electrolyte membrane 51 sandwiched by two transfer sheets was heated to 130° C. and held under pressure for 10 minutes to be hot pressed. Furthermore, using two carbon cloth pieces having a filler layer formed as the gas diffusion layers 53A and 53F, a pair of the carbon cloth pieces were arranged on the opposite sides of the membrane electrode assembly 56 in Example 1, and these were held between a pair of separators 57A and 57F to obtain the polymer electrolyte fuel cell 50 in Example 1 of a single cell. Using a fuel cell measuring device (APMT-02, made by Toyo Corporation), the I-V characteristics of the polymer electrolyte fuel cell 50 in Example 1 was measured. On this occasion, using pure hydrogen as the fuel gas, air as the oxidant gas, and a reversible hydrogen electrode (RHE) as the reference electrode, the output voltage was measured for an output of 0.5 A/cm$^2$. The water content of the catalyst particles P3 in Example 1 is shown in Table 1 and the measurement results of the output voltage of the polymer electrolyte fuel cell 50 in Example 1 are shown in FIG. 3.

Example 2

A humidified atmosphere M having a temperature of 80° C., a relative humidity of 90% RH, and a pressure of atmospheric pressure was formed in a thermostatic chamber. Platinum supporting carbon, i.e. the catalyst particles P3, was exposed to the humidified atmosphere M for 20 hours. Subsequently, through the same steps as in Example 1, the electrode catalyst layers 52A and 52F and the polymer electrolyte fuel cell 50 in Example 2 were obtained.

Example 3

A humidified atmosphere M having a temperature of 130° C., a relative humidity of 90% RH, and a pressure of atmospheric pressure was formed in a thermostatic chamber. The catalyst particles P3 were exposed to the humidified atmosphere M for 20 hours to perform the humidification step S12. Subsequently, through the same steps as in Example 1, the electrode catalyst layers 52A and 52F and the polymer electrolyte fuel cell 50 in Example 3 were obtained.

Example 4

A humidified atmosphere M having a temperature of 40° C., a relative humidity of 90% RH, and a pressure of atmospheric pressure was formed in a thermostatic chamber. The catalyst particles P3 were exposed to the humidified atmosphere M for 1 hour to perform the humidification step S12. Subsequently, through the same steps as in Example 1, the electrode catalyst layers 52A and 52F and the polymer electrolyte fuel cell 50 in Example 4 were obtained.

Comparative Example 1

The electrode catalyst layer and the polymer electrolyte fuel cell in Comparative Example 1 were obtained by the same steps as in Example 1 without performing humidification step S12 described above.

TABLE 1

| | Humidification step | | | |
|---|---|---|---|---|
| | Temperature (° C.) | Humidity (% RH) | Time (h) | Water content (%) |
| Example 1 | 80 | 90 | 100 | 10.2 |
| Example 2 | 80 | 90 | 20 | 8.5 |
| Example 3 | 130 | 90 | 20 | 11.4 |
| Example 4 | 40 | 90 | 1 | 4.8 |
| Comparative Example | — | — | — | 4.1 |

As shown in Table 1, each of the water contents in Examples 1 to 4 was larger than the water content of Comparative Example 1, i.e., 4.1%. It was also found out that the longer the exposure time of the carbon particles P1 to the humidified atmosphere M, the larger the water content of the catalyst particles P3 became; and the higher the temperature of the humidified atmosphere M, the larger the water content of the catalyst particles P3 became. As shown in FIG. 3, each of the output voltages in Examples 1 to 4 was higher than 0.632 (V), i.e. the output voltage of Comparative Example 1; and the larger the water content of the catalyst particles P3, the higher the output voltage became.

In other words, it was found out that undergoing the humidification step S12 described above, the catalyst particles P3 had a water content more than 4.1%, i.e. the water content of Comparative Example 1; and with a water content of the catalyst particles P3 in the range of 4.8 mass % or more and 11.4 mass % or less, the output voltage of the polymer electrolyte fuel cell 50 increased. It was found out that the longer the exposure time of the catalyst particles P3 (the carbon particles P1) to the humidified atmosphere M, the larger the water content of the catalyst particles P3 became, resulting in the higher output voltage of the polymer electrolyte fuel cell 50. It was also found out that in the case of the same exposure time of the catalyst particles P3 (the carbon particles P1) to the humidified atmosphere M, the higher the temperature of the humidified atmosphere M, the larger the water content of the catalyst particles P3 became, resulting in the higher output voltage of the polymer electrolyte fuel cell 50. It was found out that so long as the temperature of the humidified atmosphere M was 80° C. or higher and 130° C. or lower, in particular, the output voltage of the polymer electrolyte fuel cell 50 sufficiently increased by the humidification for about 20 hours. These phenomena indicate that the uniformity of the catalyst particles P3 (the carbon particles P1 and the catalyst material P2) and the polymer electrolyte PE in the catalyst ink increases by the humidification step S12 described above.

According to the above embodiment, the advantages listed below are achieved.

(1) Prior to the blending of the catalyst material P2 supporting carbon particles P1, i.e. the catalyst particles P3, and the polymer electrolyte PE in step S13, the catalyst particles P3 (the carbon particles P1) are exposed to the humidified atmosphere M in step S12. The affinity between the surface of the catalyst particles P3 (the carbon particles P1) and the polymer electrolyte PE is therefore enhanced compared to, for example, the case where no humidification step is applied to the catalyst particles P3 (the carbon particles P1). The catalyst ink thus has improved uniformity of the catalyst particles P3 and the polymer electrolyte PE. Accordingly, the utilization efficiency of the catalyst material P2 increases in the electrode catalyst layers 52A and 52F. In other words, the output voltage of the polymer electrolyte fuel cell 50 having the electrode catalyst layers 52A and 52F manufactured by the manufacturing method described above increases.

(2) In manufacturing the catalyst ink in step S13, the affinity between the surface of the catalyst particles P3 (the carbon particles P1) and the polymer electrolyte PE is preliminarily enhanced by the humidification step S12. Consequently the treatment time in the dispersion treatment of step S13 for improving the uniformity of the catalyst particles P3 (the carbon particles P1) and the polymer electrolyte PE is shortened. Alternatively, the dispersion treatment itself of step S13 may be omitted.

(3) After the catalyst material P2 is supported by the carbon particles P1 in step S11, the carbon particles P1 are humidified in step S12. Consequently, even if the carbon particles P1 are heated in the catalyst material P2 supporting step S11, the humidification effect of the catalyst particles P3 (carbon particles P1), which has undergone step S12, is not reduced. Rather, in the case where the catalyst particles P3 (the carbon particles P1) are heated in the supporting step S11, the water content of the catalyst particles P3 in step S11 is originally lower in some cases, than, for example, that in the case where the catalyst particles P3 (the carbon particles P1) are not heated in step S11. The advantages of the above-described (1) and (2), i.e. the advantages obtained through the humidification step S12, are therefore more pronounced.

(4) Until the carbon particles P1 are added to the ink solvent S in step S13, the temperature of the catalyst particles P3 (the carbon particles P1) is maintained at a temperature below the humidification temperature. Consequently, for example, reduction in the water content of the carbon particles P1 after the humidification step S12 is prevented. Accordingly, reduction in the advantages of the above-described (1) to (3) obtained by the humidification step is prevented.

(5) The water content of the catalyst particles P3 can be set to 4.8 mass % or more and 11.4 mass % or less. The variation in the effect of the humidification step S12 may be reduced within a predetermined range. Since the water content of the catalyst particles P3 is set to 11.4 wt. % or less, the exposure time of the catalyst particles P3 (the carbon particles P1) to the humidified atmosphere M is kept from being excessively prolonged. Accordingly, for example, reduction in the productivity of the electrode catalyst layers 52A and 52F may be prevented by performing the humidification step.

(6) The humidified atmosphere M has a temperature of 80° C. or higher and 130° C. or lower. Consequently, the saturated vapor pressure of the humidified atmosphere M increases compared to, for example, the case of the humidified atmosphere M at room temperature. The humidifying time for increasing the water content of the catalyst particles P3 to a predetermined value is thus shortened, compared to, for example, the case of the humidified atmosphere M at room temperature.

(7) The relative humidity of the humidified atmosphere M is 90% RH or more and less than 100% RH. Consequently the humidifying time for increasing the water content of the catalyst particles P3 to a predetermined value is shortened, compared to, for example, the case of the relative humidity less than 90% RH.

(8) The weight ratio of the polymer electrolyte PE to the catalyst material P2 supporting carbon particles P1, i.e. catalyst particles P3, is 0.04 or more and 3.00 or less.

Consequently, the variation in the effects of the humidification step due to, for example, the effect in difference in the weight ratio is reduced within a predetermined range.

(9) The catalyst particles P3 having a specific surface area measured in accordance with Japanese Industrial Standard JIS K 6217-2 of 200 m²/g or more and 1,500 m²/g or less allow the fine pores of the catalyst particles P3 to be easily hydrated. Furthermore, the gas diffusivity of the membrane electrode assembly 56 is maintained in an appropriate range.

Figure 4:
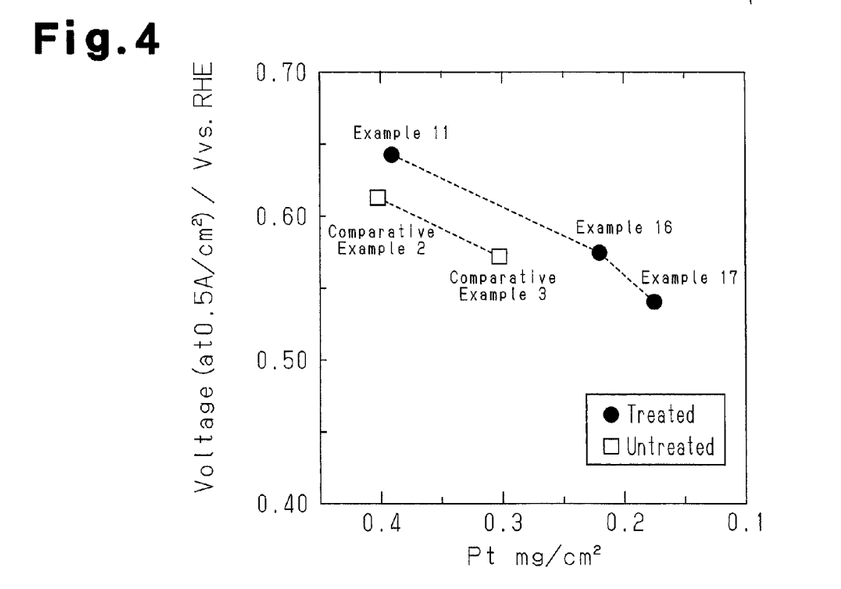
FIG. 4 is a line graph showing the output voltage in further Examples and Comparative Examples in terms of the supported amount of a catalyst.

The measurement results of further Examples and Comparative Examples are shown in Table 2 and FIG. 4.

Example 11

A humidified atmosphere M having a temperature of 130° C., a relative humidity of 90% RH, and a pressure of atmospheric pressure was formed in a thermostatic chamber. The catalyst particles P3 as platinum supporting carbon (product name: TEC10E50E, made by Tanaka Kikinzoku Kogyo K.K.) were exposed to the humidified atmosphere M for 10 hours. Subsequently the electrode catalyst layers 52A and 52F and the polymer electrolyte fuel cell 50 in Example 11 were obtained, through the same steps as in Example 1.

In Example 11, the output voltages for an output of 0.3 A/cm² and an output of 0.5 A/cm² were measured, respectively. The measurement results are shown in Table 2.

Example 12

The electrode catalyst layer 52A for the air electrode 54 was obtained through the same steps of humidification, dispersion, and film forming, as in Example 11. On the other hand, the electrode catalyst layer 52F for the fuel electrode 55 was obtained without application of the humidification step S12, through the same steps of dispersion and film forming as in Example 11. Using the thus produced electrode catalyst layer 52A for the air electrode 54 and the electrode catalyst layer 52F for the fuel electrode 55, the membrane electrode assembly 56 in Example 12 was obtained through the same joining step as in Example 11. The surface having the electrode catalyst layer 52A constituted the air electrode 54 and the surface having the electrode catalyst layer 52F constituted the fuel electrode 55, so that the polymer electrolyte fuel cell 50 in Example 12 was obtained. The output voltage was measured in the same manner as in Example 11.

Example 13

Without application of the humidification step S12, the electrode catalyst layer 52A for the air electrode 54 was obtained through the same steps of dispersing and film forming as in Example 11. On the other hand, the electrode catalyst layer 52F for the fuel electrode 55 was obtained through the same steps of humidification, dispersion, and film forming as in Example 11. Using thus produced electrode catalyst layer 52A and the electrode catalyst layer 52F, the membrane electrode assembly 56 in Example 13 was obtained through the same joining step as in Example 11.

Example 14

A humidified atmosphere M having a temperature of 80° C., a relative humidity of 90% RH, and a pressure of atmospheric pressure was formed in a thermostatic chamber. The catalyst particles P3 as platinum supporting carbon were exposed to the humidified atmosphere M for 20 hours to perform the humidification step S12. Subsequently, the membrane electrode assembly 56 and the polymer electrolyte fuel cell 50 in Example 14 were obtained through the same steps as in Example 11.

Example 15

A humidified atmosphere M having a temperature of 40° C., a relative humidity of 90% RH, and a pressure of atmospheric pressure was formed in a thermostatic chamber. The catalyst particles P3 were exposed to the humidified atmosphere M for 10 hours to perform the humidification step S12. Subsequently, the membrane electrode assembly 56 and the polymer electrolyte fuel cell 50 in Example 15 were obtained through the same steps as in Example 11.

Comparative Example 2

Without humidification step S12, both the electrode catalyst layer 52A for the air electrode 54 and the electrode catalyst layer 52F for the fuel electrode 55 were manufactured by the same steps as in Example 11. The membrane electrode assembly and the polymer electrolyte fuel cell in Comparative Example 2 were thus obtained.

Example 16

In the above-described Examples and Comparative Examples, the amount of the supported catalyst material P2, i.e. the amount of supported platinum, was 0.4 mg/cm². In Example 16, however, the amount of the supported catalyst material P2 was changed to 0.22 mg/cm². The amount of the supported catalyst material P2 was changed by, for example, adjusting the thickness of electrode catalyst layers 52A and 52F in the film forming step S14. In the humidification step S12, a humidified atmosphere M having a temperature of 130° C., a relative humidity of 90% RH, and a pressure of atmospheric pressure was formed in a thermostatic chamber in the same manner as in Example 11. The catalyst particles P3 were exposed to the humidified atmosphere M for 10 hours. Subsequently, the membrane electrode assembly 56 and the polymer electrolyte fuel cell 50 in Example 16 were obtained through the same steps as in Example 11.

Example 17

The amount of the supported catalyst material P2 was reduced from that of Example 16 to 0.17 mg/cm². In the humidification step S12, a humidified atmosphere M having a temperature of 130° C., a relative humidity of 90% RH, and a pressure of atmospheric pressure was formed in a thermostatic chamber in the same manner as in Example 16. The catalyst particles P3 were exposed to the humidified atmosphere M for 10 hours. Subsequently, the membrane electrode assembly 56 and the polymer electrolyte fuel cell 50 in Example 17 were obtained through the same steps as in Example 16.

Comparative Example 3

Except that the amount of the supported catalyst material P2 was reduced from that of Comparative Example 2 to 0.30 mg/cm², the other steps were the same as in Comparative Example 2. In other words, both the electrode catalyst layer 52A for the air electrode 54 and the electrode catalyst layer 52F for the fuel electrode 55 were manufactured without performing humidification step S12. The membrane electrode assembly and the polymer electrolyte fuel cell in Comparative Example 3 were thus obtained.

Example 17 have a smaller amount of the supported catalyst material P2 than Comparative Example 3, the output voltage is increased even with a smaller amount of the catalyst material P2, by undergoing the humidification step S12.

TABLE 2

| | Fuel electrode | Air electrode | Treatment condition | | | Voltage value | | Catalyst |
| | | | Temperature (° C.) | Humidity (% RH) | Time (h) | 0.3 A/cm$^2$ | 0.5 A/cm$^2$ | amount (mg/cm$^2$) |
| --- | --- | --- | --- | --- | --- | --- | --- | --- |
| Example 11 | Treated | Treated | 130 | 90 | 10 | 0.726 | 0.645 | 0.4 |
| Example 12 | — | Treated | 130 | 90 | 10 | 0.729 | 0.640 | 0.4 |
| Example 13 | Treated | — | 130 | 90 | 10 | 0.720 | 0.621 | 0.4 |
| Example 14 | Treated | Treated | 80 | 90 | 20 | 0.717 | 0.635 | 0.4 |
| Example 15 | Treated | Treated | 40 | 90 | 10 | 0.711 | 0.620 | 0.4 |
| Comparative Example 2 | — | — | — | — | — | 0.712 | 0.615 | 0.4 |
| Example 16 | Treated | Treated | 130 | 90 | 10 | 0.651 | 0.580 | 0.22 |
| Example 17 | Treated | Treated | 130 | 90 | 10 | 0.634 | 0.544 | 0.17 |
| Comparative Example 3 | — | — | — | — | — | 0.668 | 0.575 | 0.3 |

As shown in Table 2, the output voltages in Examples 11 to 13 were higher than that of Comparative Example 2 for each of the outputs 0.3 A/cm$^2$ and 0.5 A/cm$^2$. In other words, it was found out that the output voltage of the polymer electrolyte fuel cell 50 increased by the humidification step S12. This indicates that the increased water content of the catalyst particles P3 due to the humidification step allows for improved uniformity of the catalyst particles P3 and the polymer electrolyte in a catalyst ink.

Comparing Examples 11, 14, and 15 with each other, it was found out that the output voltage increased as the temperature of the humidified atmosphere M increased. This indicates that the catalyst particles P3 include more water content as the temperature of the humidified atmosphere M increases.

Comparing Examples 12 and 13 with each other, it was found out that the output voltage in Example 12 is higher than the output voltage in Example 13. In other words, it was found out that in the case where the electrode catalyst layer that had undergone the humidification step, was used for only one side of the membrane electrode assembly 56, the use of the electrode catalyst layer that had undergone the humidification step as the air electrode 54 produced higher output voltage of a fuel cell 50 than the use as the fuel electrode 55. As described above, the activity of the reaction of the air electrode 54 rather than the fuel electrode 55 in a fuel cell has larger effects on the progress of the electrode reaction of the entire fuel cell 50. In Example 12, the water content of the catalyst particles P3 in the electrode catalyst layer 52A, which constitutes a part of the air electrode 54, increased by the humidification step, so that the utilization efficiency of the catalyst material P2 was improved. In other words, it is indicated that the reaction of the air electrode 54 was activated in Example 12, so that the output voltage of the fuel cell 50 increased compared to, for example, the case in Example 13 where the electrode catalyst layer 52F, which had undergone the humidification step, was used only for the fuel electrode 55.

The output voltages in Example 16 and Example 17 were lower than that in the Example 11. The output voltage in Comparative Example 3 is lower than the output voltage in Comparative Example 2. The output voltages of Example 16 and Example 17 are, however, maintained at an approximately same level as the output voltage of Comparative Example 3. In other words, although both of Example 16 and According to the above Examples, the advantages listed below are obtained further in addition to the above-described advantage.

(11) Of the two electrode catalyst layers 52A and 52F of the membrane electrode assembly 56, the electrode catalyst layer 52A, which constitutes a part of the air electrode 54, may be formed through the humidification step. This allows the utilization efficiency of the catalyst material P2 to be increased in the electrode catalyst layer 52A of the air electrode 54. Consequently, the reaction of the air electrode 54 is activated, so that the output voltage of a polymer electrolyte fuel cell 50 increases, compared to, for example, the case where only the electrode catalyst layer 52F constituting a part of the fuel electrode 55 is formed through the humidification step.

(12) Undergoing the humidification step S12 allows the output voltage of a polymer electrolyte fuel cell 50 to increase even with a smaller amount of the catalyst material P2.

The above embodiment may be modified as follows.

The electrode catalyst layer formed through the humidification step S12 may be only one of the two electrode catalyst layers 52A and 52F of the membrane electrode assembly 56. In other words, only one electrode catalyst layer arranged on one of the opposite sides of the polymer electrolyte membrane 51 may be formed through the humidification step S12, while the other electrode catalyst layer arranged on the other side may be formed without undergoing the humidification step.

In a fuel cell, the reaction barrier for a reaction at an air electrode is generally larger than the reaction barrier for a reaction at a fuel electrode. Consequently, the activation of a reaction at an air electrode has a larger effect on the progress of an electrode reaction of the entire fuel cell. Accordingly, for example, in the case where only one of the electrode catalyst layers 52A and 52F of a membrane electrode assembly 56 is formed through the humidification step S12, preferably the electrode catalyst layer 52A constituting the air electrode 54 is formed through the humidification step S12.

According to the required performance of a polymer electrolyte fuel cell 50, the weight ratio of catalyst particles P3 to polymer electrolyte PE may be different between the electrode catalyst layer 52A constituting a part of the air electrode 54 and the electrode catalyst layer 52F constituting a part of the fuel electrode 55.

The weight ratio of the polymer electrolyte PE to the catalyst material P2 supporting carbon particles P1, i.e. the catalyst particles P3, may be less than 0.04 or more than 3.00. Even by such a method, the advantages equivalent to the above are obtained.

The relative humidity of the humidified atmosphere M in step S12 may be less than 90% RH. Even by such a method, the advantages equivalent to the above are obtained.

The temperature of the humidified atmosphere M in step S12 may be lower than 80° C. or higher than 130° C. Even by such a method, the advantages equivalent to the above are obtained.

The water content of the catalyst particles P3, which has undergone the humidification step S12, may be less than 4.8 wt. % or more than 11.4 wt. %. For example, a method may be employed in which the temperature of the catalyst particles P3 reaches the humidification temperature or higher prior to the addition of the catalyst particles P3 (the carbon particles P1) to an ink solvent S. Even by such a method, the water content of the catalyst particles P3, which has undergone the humidification step S12, is larger than, for example, that of the catalyst particles P3 without undergoing the humidification step. Consequently, the advantages equivalent to the above are obtained in no small way.

In essence of the method of the present embodiment, prior to the blending of the catalyst material P2 supporting carbon particles P1, i.e. catalyst particles P3, and the polymer electrolyte PE, the catalyst particles P3 (the carbon particles P1) only needs to be exposed to the humidified atmosphere M.

In the case where at least a part of the water content in the carbon particles P1 hydrated in the humidification step S12 is held in the carbon particles P1 until the dispersion step S13, the humidification step S12 may be performed prior to the supporting step S11. Alternatively, the humidification step S12 may be performed in the middle of the supporting step S11. Even by such a method, the advantages equivalent to the above are obtained in no small way.

The pressure of the humidified atmosphere M in step S12 may be higher than atmospheric pressure. Such a humidified atmosphere M allows the above advantages to be obtained, and besides that, the hydration of the catalyst particles P3 (the carbon particles P1) is promoted, compared to, for example, the case of humidified atmosphere at a negative pressure or at an atmospheric pressure.

Until the blending of the catalyst material P2 supporting carbon particles P1 in step S11, i.e. catalyst particles P3, and the polymer electrolyte PE in step S13, the catalyst particles P3, which have undergone the humidification step S12, may be stored in a humidified atmosphere M. Such a method allows the above advantages to be obtained. Furthermore, reduction in the advantages of the carbon particles P1 maintaining a water content after the humidification step may be surely prevented. In other words, reduction in the above advantages obtained by the humidification step is surely prevented.

A part of water molecules contained in the humidified atmosphere M in step S12 may be charged with electrostatic charges having a polarity opposite to the polarity that the catalyst particles P3 (carbon particles P1) have. Such a humidified atmosphere M allows the above advantages to be obtained, and besides that, the hydration of the catalyst particles P3 is promoted.

In the humidification step S12, the catalyst particles P3 exposed to a humidified atmosphere M may receive vibration or other energy from outside. The hydration of the catalyst particles P3 may be promoted with the energy from outside.

The specific surface area of the catalyst particles P3 measured in accordance with Japanese Industrial Standard JIS K 6217-2 may be less than 200 $m^2/g$ or more than 1,500 $m^2/g$. Even by such a method, the advantages equivalent to the above are obtained.

The number of the membrane electrode assembly 56 sandwiched by a pair of separators 57A and 57F may be two or more. In the case where two or more membrane electrode assemblies 56 are sandwiched, the assemblies are preferably stacked. Even in such a configuration, the advantages equivalent to the above are obtained.

The polymer electrolyte fuel cell 50 may include a gas supply apparatus for supplying gas to gas flow paths 58A and 58F, and a cooling apparatus for supplying cooling water to cooling water flow paths 59A and 59F. In other words, the polymer electrolyte fuel cell 50 may include an apparatus supplementary to the membrane electrode assembly 56 and the separators 57A and 57F.

DESCRIPTION OF THE REFERENCE NUMERALS

M . . . Humidified Atmosphere; S . . . Ink Solvent, P1 . . . Carbon Particles, P2 . . . Catalyst Material, P3 . . . Catalyst Particles P3 As Catalyst Material Supporting Carbon Material, Pe . . . Polymer Electrolyte, 50 . . . Polymer electrolyte fuel cell, 51 . . . Polymer Electrolyte Membrane, 52*a* and 52*f* . . . Electrode Catalyst Layer For Fuel Cell, 53*a* and 53*f* . . . Gas Diffusion Layer, 54 . . . Air Electrode, 55 . . . Fuel Electrode, 56 . . . Membrane Electrode Assembly, 57*a* and 57*f* . . . Separator, 58*a* and 58*f* . . . Gas Flow Path, 59*a* and 59*f* . . . Cooling Water Flow Path.

The invention claimed is:

1. A manufacturing method of catalyst particles comprising:
exposing catalyst particles, which are carbon particles supporting a catalyst material, to a humidified atmosphere, prior to dispersing the carbon particles and a polymer electrolyte in a solvent for a catalyst ink,
wherein the exposing the carbon particles to the humidified atmosphere includes adjusting a water content of the catalyst particles as the carbon particles supporting the catalyst material to 4.8 mass % or more and 11.4 mass % or less to prevent the water content of the catalyst particles from being saturated.

2. The manufacturing method according to claim 1, further comprising allowing the carbon particles to support the catalyst material prior to exposure of the carbon particles to the humidified atmosphere.

3. The manufacturing method according to claim 1, further comprising maintaining a temperature of the carbon particles below the temperature of the humidified atmosphere until the carbon particles are added to the solvent.

4. The manufacturing method according to claim 1, wherein the exposure of the carbon particles to the humidified atmosphere includes exposing the carbon particles to the humidified atmosphere having a temperature of 80° C. or higher and 130° C. or lower.

5. The manufacturing method according to claim 1, wherein the exposure of the carbon particles to the humidified atmosphere includes exposing the carbon particles to the humidified atmosphere having a relative humidity of 90% RH or more and less than 100% RH.

6. The manufacturing method according to claim 1, further comprising providing, as the carbon particles to be exposed to the humidified atmosphere, carbon particles having a specific surface area measured in accordance with JIS K 6217-2 of 200 $m^2/g$ or more and 1,500 $m^2/g$ or less.

7. A manufacturing method of a catalyst ink, comprising:
forming the catalyst ink by dispersing the catalyst particles manufactured by the manufacturing method according to claim 1 and a polymer electrolyte in a solvent; and
adjusting a weight ratio of the polymer electrolyte to the catalyst particles as the carbon particles supporting the catalyst material to 0.04 or more and 3.00 or less.

8. Catalyst particles comprising:
a catalyst material and carbon particles supporting the catalyst material, wherein the catalyst particles has a water content of 4.8 mass % or more and 11.4 mass % or less to prevent the water content of the catalyst particles from being saturated.

9. The catalyst particles according to claim 8, wherein the catalyst particles have a specific surface area measured in accordance with JIS K 6217-2 of 200 $m^2/g$ or more and 1,500 $m^2/g$ or less.

10. The catalyst particles according to claim 8, wherein the water content of the catalyst particles is achieved by exposing the carbon particles to the humidified atmosphere prior to dispersion of the catalyst particles and the polymer electrolyte in a solvent for a catalyst ink.

11. A catalyst ink produced by dispersing the catalyst particles according to claim 8 and a polymer electrolyte in a solvent, wherein a weight ratio of the polymer electrolyte to the catalyst particles is 0.04 or more and 3.00 or less.

12. An electrode catalyst layer for a fuel cell formed on a substrate by applying the catalyst ink according to claim 11 to the substrate.

13. A membrane electrode assembly of a polymer electrolyte fuel cell, comprising the electrode catalyst layer according to claim 12 for constituting at least an air electrode of a fuel electrode and the air electrode.

14. A polymer electrolyte fuel cell comprising the membrane electrode assembly according to claim 13 and a pair of separators for sandwiching the membrane electrode assembly therebetween.

* * * * *